Inventor
Marcellus S. Merrill.
WHITEHEAD & VOGL
By Carle Whitehead
Attorneys

Sept. 10, 1935.  M. S. MERRILL  2,013,785

FRAME STRAIGHTENING APPARATUS FOR AUTOMOBILES

Filed Aug. 1, 1933  3 Sheets-Sheet 2

Inventor
Marcellus S. Merrill

WHITEHEAD & VOGL
By Earle Whitehead
Attorneys

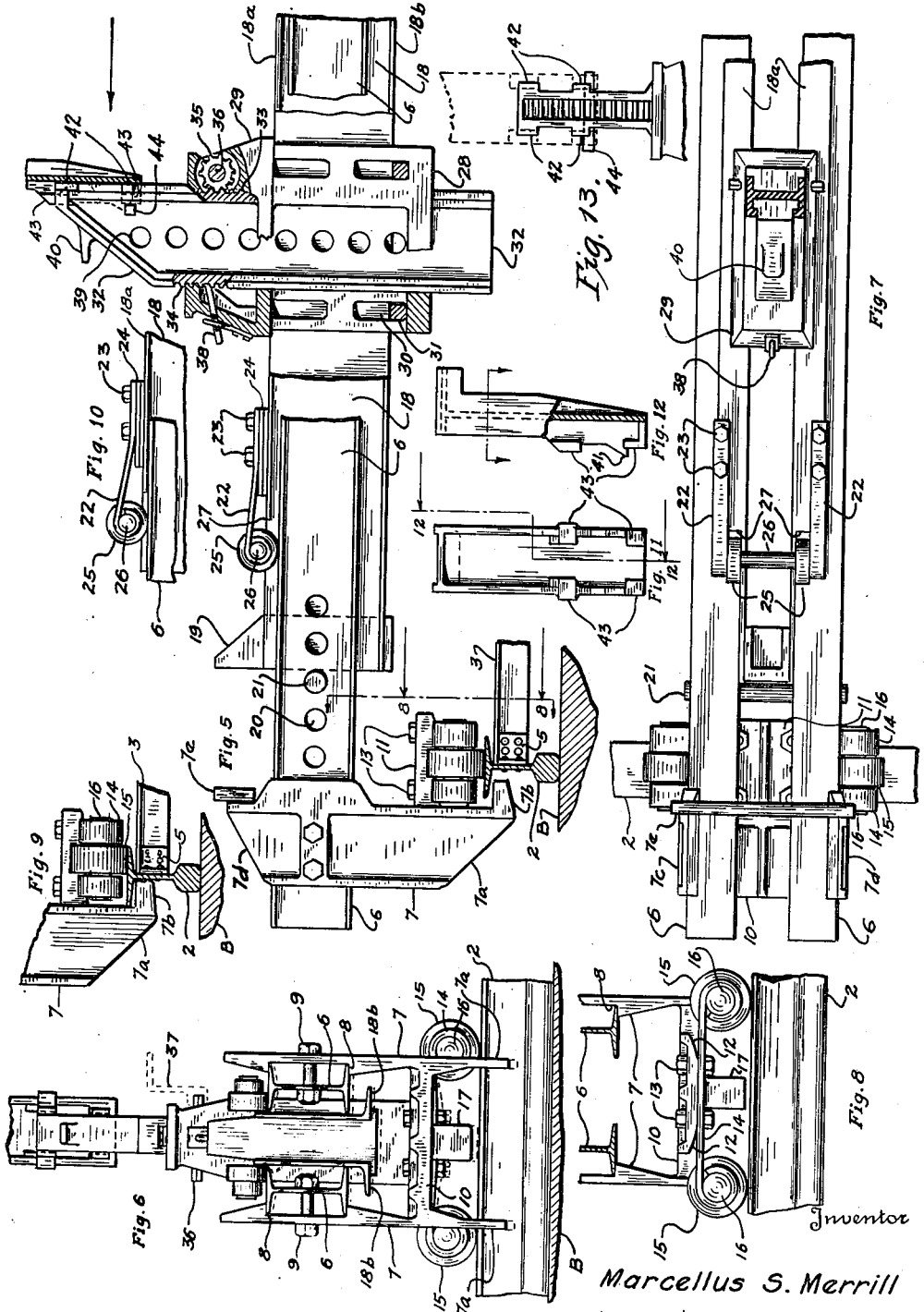

Patented Sept. 10, 1935

2,013,785

UNITED STATES PATENT OFFICE 2,013,785

FRAME STRAIGHTENING APPARATUS FOR AUTOMOBILES

Marcellus S. Merrill, Denver, Colo.

Application August 1, 1933, Serial No. 683,136

10 Claims. (Cl. 153—32)

This invention relates to apparatus for straightening frames of automobiles and has for an object to provide a device consisting of parts so designed and combined that a bend or displacement of any nature or in any direction in any portion of the frame of an automobile can be straightened and/or repositioned by said apparatus while the frame is cold and without removing the frame from, or otherwise disassembling, the automobile.

A further object is the provision of a unitary structure of general utility, of the utmost efficiency and of substantially universal application in the class of work above mentioned.

A further object is the provision of a device of the class described in which elements constructed and designed to hold an automobile frame in a variety of desired positions, while in place in the automobile, and to hold the same in any of such positions against pressure exerted from predetermined directions sufficient to bend or reposition said frame or any parts thereof while cold, are combined with elements having in combination such power, strength, and adjustability, with reference to each other, to such frame and to such holding elements, that there may be exerted, upon any desired portion of such frame, from any desired direction, sufficient force to bend or reposition such frame or parts thereof while cold, while in place in such automobile and while held by such holding elements.

With these and other objects in view, as will more fully appear from the following specification and as illustrated in the accompanying drawings, the invention comprises certain novel constructions, combinations and arrangements of parts as will now be described in this specification and defined in the appended claims and as illustrated in the accompanying drawings, which are for illustrative purposes only and not intended as a definition or limitation of the invention, in which like characters of reference indicate corresponding parts throughout and in which—

Fig. 5 is a detailed enlargement of the left end of Fig. 2.

Fig. 6 is an end view of Fig. 5.

Fig. 7 is a top view of Fig. 5.

Fig. 8 is a view on line 8—8 of Fig. 5 looking in the direction of the arrows.

Fig. 9 is a detailed view of the lower left fragment of Fig. 5, showing the parts in shifted position.

Fig. 10 is a detail of the top central fragment of Fig. 5 showing parts in depressed position.

Fig. 11 is a rear elevation of one of the removable teeth.

Fig. 12 is a side elevation partly in section on line 12—12 of Fig. 11.

Fig. 13 is a fragmentary view at top right of Fig. 5 looking in direction of the arrow.

Figure 1:
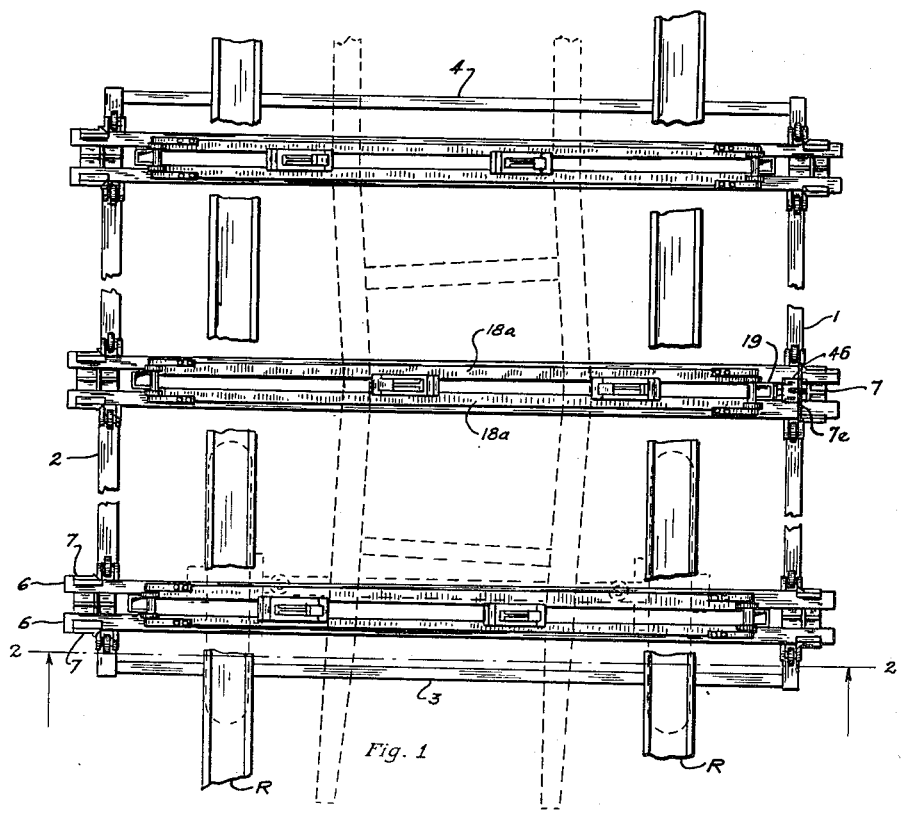
Fig. 1 is a plan view of the apparatus with certain portions broken out and with a bent automobile frame conventionally indicated in broken lines.

For convenience, this apparatus may be positioned over a pit, indicated at A in a floor indicated at B in Figs. 2, 5, 6, and 9.

The apparatus is mounted upon a frame composed of rails 1 and 2, here illustrated as railroad rails inverted, but which may be beams of any suitable form and strength, and brace beams 3 and 4, for spacing and bracing the rails 1 and 2, and which may be attached to said rails in any suitable manner as by bolted brackets 5, clearly shown at Figs. 5 and 9.

A plurality of members adapted to selectively hold and/or exert pressure upon any desired points in the frame of the automobile, positioned at right angles to the rails 1 and 2 and movable along said rails and preferably rollingly supported thereon, and hereinafter referred to as the holding-pressure units, will now be described.

I preferably provide three of the holding-pressure units in order to afford the means for holding the frame in any desired position and against pressure from any desired direction, and for exerting pressure at any desired point and in any desired direction on the frame. Certain operations may be performed with less than three units but the apparatus would not perform all of the commonly required operations with less than three of the units.

All of the holding-pressure units are conveniently and preferably of the same construction, so that it will be necessary to describe in detail only one of them.

A holding-pressure unit includes side beams 6, preferably of I cross section, as clearly shown at Fig. 6. The side beams are supported upon and movable along rails 1 and 2 by means of abutment brackets 7, engaging and supporting the side beams 6 in any suitable manner, but preferably by means of notches 8 for seating the beams, and bolts 9 for securing the beams in such seats, the brackets being formed with a cross member 10 provided with an extension 11, preferably beveled on the under side as at 12, to the under side of which extension there is secured in suitable manner, as by bolts 13, two springs 14. Each spring 14 carries at each of its ends a roller 15, adapted to roll along the rails 1 and 2. The rollers 15 are preferably mounted on springs 14 by means of a hub 16 projecting from the roller on each side and around which hub the ends of the springs 14 are bent, as clearly shown in the various figures. The extension 11 is provided on its under side with a stop 17, projecting downwardly to a point near the surface of the rail and adapted to rest upon the rail when the springs 14 are depressed. The springs 14 are of sufficient strength to normally support the weight of the holding-pressure unit and prevent the contact of the stop 17 with the rail, thus leaving the holding-pressure unit free to roll along the rails 1 and 2 upon the rollers 15, but the springs 14 are of such strength that when substantial weight is added to the holding-pressure unit or downward pressure is exerted thereon, the springs 14 will be depressed and the weight of the holding-pressure unit and its load will be carried by the stop 17 resting upon the rail.

The sides of the bracket 7 have downward extensions, 7a, carrying lugs 7b, extending beneath the upper flange of the rail, but normally out of contact with the rail as clearly shown at the left at Fig. 5. In certain operations the holding-pressure unit will be forced to one side and when forced to one side the lug 7b will engage the web of the rail as clearly shown in Fig. 9. The bevels 12 are formed in order to provide for the change of shape of springs 14 when depressed.

A holding-pressure unit includes an assembly mounted upon and between and movable longitudinally of the side beams 6, and hereinafter referred to as the slide unit or member. A slide unit comprises two parallel channel beams 18, mounted between the side beams 6 with their flat surfaces opposed, and their upper and lower flanges 18a and 18b extending outwardly and respectively above and below the side beams 6, as clearly shown at Figs. 5, 6, and 7, the webs of the beams 18 resting against and being slidable along and across the inner edges of the flanges of the beams 6 as clearly shown at Fig. 6.

The beams 18 carry and are spaced apart by abutment members 19 positioned between the beams 18 at each end of said beams. Side beams 6 are provided with means, as holes 20, for holding a stop member, as pin 21, at any desired distance from the abutment bracket 7, whereby to provide a stop for the abutment member 19 at any desired position along the beams 6.

The slide unit is movably supported upon the tops of side beams 6 and is preferably so supported that the top flanges of the beams 18 will be normally but yieldingly supported above the tops of the beams 6 and out of contact therewith, and such support is preferably a rolling support whereby the slide unit normally may be rolled along the tops of the beams 6 as desired, but such support is preferably yielding to permit the depression of the slide unit so that the flanges 18a will rest upon the tops of the beams 6 when weight is added to the slide unit or downward pressure is exerted thereon. The preferable form of support for these purposes is clearly illustrated at Figs. 5, 7, and 10, and consists of springs 22 suitably attached to the top of the flanges 18a as by bolts 23 and preferably spaced thereabove, as by blocks 24. Each of these springs carries at its free end a roller 25 similar in construction to the rollers 15, provided with hubs 26, around which the ends of the springs 22 may be bent, whereby the slide unit is normally rollingly supported on the top of beams 6 by means of the rollers 25 and the springs 22, and the flanges 18a are normally raised out of contact with the tops of the beams 6, as clearly illustrated at Fig. 5, but when weight is placed upon the slide unit or downward pressure exerted thereon the springs 22 are depressed and the flanges 18a rest upon the tops of the beams 6, as clearly illustrated at Fig. 10. It will be noted that the flanges 18a are cut away at each end to accommodate rollers 25, as at 27.

For applying pressure to the parts of the frame of the automobile I provide a member slidably mounted between the channel beams 18 which I shall hereinafter refer to as the jaw member. This member comprises a framework 28, having a sliding fit between the inner opposed faces of channel beams 18, and having its upper portion enlarged into a crown 29, the edges of the base of which are adapted to rest and slide upon the tops of the channel beams 18 as clearly illustrated at Figs. 2, 5 and 7. The lower portion of the frame 28 is provided with apertures 30 extending below the bottom of the channel beams 18 to a sufficient distance to accommodate wedges 31 whereby to rigidly secure the framework 28 to the channel beams 18 at any desired point along said beams.

The framework 28 is provided with a centrally located vertical runway in which is slidingly mounted the jaw 32 provided with racks 33 and 34, upon its front and rear edges. A pinion 35 is revolubly mounted in the crown 29 in engagement with the rack 33, the shaft 36 of the pinion projecting beyond the sides of the crown, as clearly shown at Fig. 6, and being adapted to receive a handle 37 for manually rotating the pinion 35 for raising or lowering the jaw 32. A pawl 38 is provided in the crown for engagement with the rack 34, whereby to retain the jaw at any height to which it may be raised by the revolutions of the pinion 35. For dropping the jaw, the pawl 38 may be manually withdrawn from engagement with the rack 34.

Figure 2:
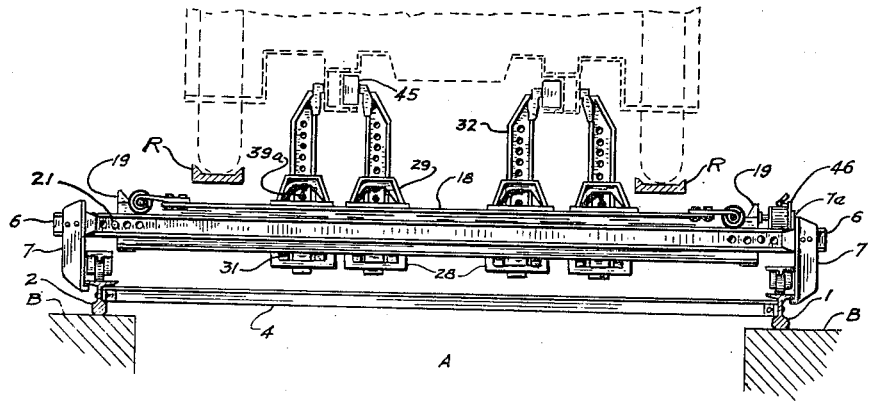
Fig. 2 is a front view partly in section and taken on line 2—2 of Fig. 1.
Figure 4:
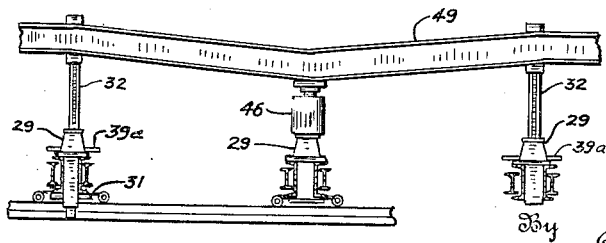
Fig. 4 is a fragmentary view illustrating use of the apparatus for straightening a sag in a frame member.

Holes 39 are provided in the jaw through one of which a pin 39a is inserted, the ends of the pin projecting through the open sides of the crown 29 as clearly shown at Figs. 2 and 4, for holding the jaw against downward pressure or upward pull.

A hand-hold 40 is provided on the top of the jaw to facilitate the positioning of the jaw. This may also be used as a bearing for an additional bracing element, not shown.

Teeth of any desired shape for suitably engaging the parts of variously shaped frames of automobiles are provided for said jaw, one of said teeth being indicated in fragmentary section at upper right of Fig. 5 and the same being shown in detail in different positions at Figs. 11, 12, and 13. The details of construction by which such teeth are placed in rigid engagement with the jaw 32 may be varied, but such construction is here illustrated as consisting of lugs 42, on the front face of the jaw and interengaging lugs 43 on the rear face of the tooth, the tooth being made sufficiently wide to fit over the front face of the top of the jaw and be slid upwardly so that the front faces of lugs 43 will engage the rear faces of lugs 42 and under spur 41 a wedge 44 is inserted for holding the tooth in the raised position with the lugs interengaging as shown at Fig. 13.

Having described the details of the structure, I shall now describe its operation.

Figure 3:
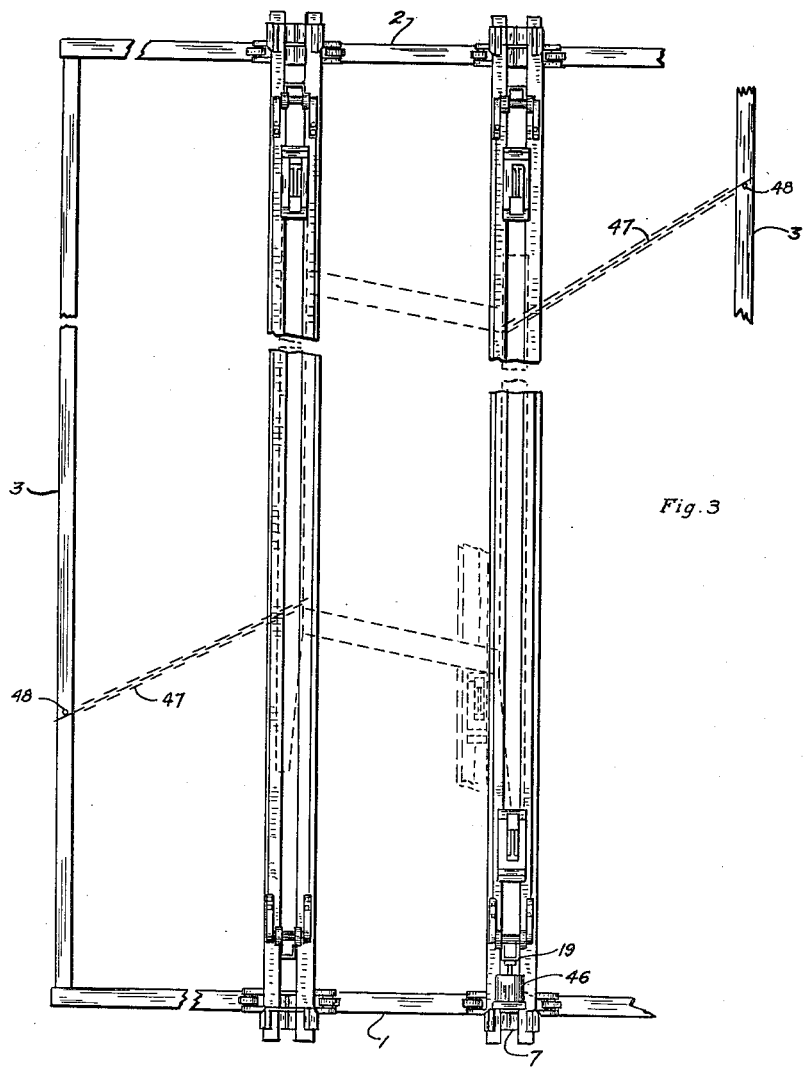
Fig. 3 is a plan view of a portion of the structure shown in Fig. 1 but arranged for straightening a "racked" automobile frame which is thereon indicated in broken lines.

In Figs. 1 and 2 I have illustrated the use of the apparatus in performing what is known as a "throw-over", or in other words the straightening of a lateral bend in a frame. In Fig. 3 the apparatus is illustrated as applied to a "racked" frame, and in Fig. 4 it is illustrated as applied in straightening a sag or downward bend in a member of the frame. Keeping in mind the foregoing description of the apparatus and the following description of the three operations used as illustrative of its application, the adjustment and application of the apparatus to any kind of a distortion in the frame of an automobile will be obvious to anyone skilled in the art, and no attempt is made to describe in detail every application of the apparatus to every kind of a distortion of the frame. The "throw-over" will be first described.

For performing the desired operation the automobile is positioned above the apparatus with the frame at such distance above the apparatus that the teeth attached to the upper ends of the jaws shall engage the desired portions of the frame. This positioning of the automobile is conveniently accomplished by the provision of runways R, on which the automobile may be run into desired position above the apparatus. One of the holding-pressure units, illustrated at Fig. 1 as the central unit, is moved upon the rails 1 and 2 into a position beneath the apex of the bend of the frame. Two of the jaw members are adjusted to such a position in the slide member of this unit that the teeth of such jaw members will engage the apexes of the bends in the two side members of the frame. The jaw members are secured in this position by the wedges 31, the jaws being adjusted to the proper height by the operation of the pinion 35 by the handle 37, and being held at the desired height by the pawl 38 which is sufficient in this case, because no up or down pressure is to be exerted. The side members of the frame of the automobile are here illustrated as being of channel construction and in such a case it is preferable to insert in the channel a block, 45, to serve as a bearing for the tooth as clearly illustrated at Fig. 2, the tooth in such case being of the construction illustrated at Fig. 12. A hydraulic jack, 46, is inserted between the abutment bracket 7 and the abutment member 19.

The other holding-pressure units are positioned along the rails 1 and 2 at suitable distances on the two sides of the bend, as clearly illustrated at Fig. 1. The jaw members in these two units are set in engagement with the side members of the automobile frame in such position as to hold said frame at their respective points of contact when pressure is exerted by the jack 46, it being understood that the slide members are held against movement by the pins 21. When the apparatus is thus adjusted and set the jack 46 is operated to exert pressure against the abutment 19, thus causing the slide unit of the central pressure unit to move to the left and causing the jaw members fixed in said slide unit to exert pressure upon the side members of the frame at the apexes of the bend therein and thus moving said side members of the frame to the left until the frame is straightened. It will be noted that when pressure is exerted by the jack 46, the lug 7b of abutment bracket 7 at the left of the central holding-pressure unit will be drawn into engagement with the rail 2, as clearly illustrated at Fig. 9, which engagement will prevent further movement of the central holding-pressure unit to the right, whereby the abutment bracket 7 at the right of said unit will furnish a rigid abutment for the operation of the jack 46. Conversely, the lugs 7b of the abutment brackets 7 of the other two holding-pressure units will be drawn into engagement with the rail 1 and will prevent further movement of these units to the left, thus furnishing rigid abutments for the side members of the frame at their points of contact with the teeth of the jaw members of the said two holding-pressure units.

When the base of the jack is too small to engage both abutments 7c and 7d at the top of abutment bracket 7 a crossbar 7e may be inserted against which to seat the jack.

In order to straighten a racked frame, two of the holding-pressure units are positioned on the rails 1 and 2 and spaced apart a distance substantially equal to the space between the side members of the automobile frame. The automobile is then positioned over said holding-pressure units with the side members of its frame above and parallel to said units, and at a suitable height thereabove for engagement of the frame by the teeth of the jaw members of the holding-pressure units. To prevent sidewise movement of the frame, chains 47 may be secured to the frame at suitable points, the other ends of the chains being secured to the brace bars 3 and 4, suitable means as lugs 48 being provided on the brace bars to prevent slipping of the chains. A jaw member of one of the holding-pressure units is then set to form an abutment for the end of one of the side members of the frame and a jaw member of the other unit is set against the opposite end of the other side member of the frame and the jack 46 is inserted between the abutment bracket 7 and the abutment 19 and the jack is operated until the side member of the frame against which it is exerting pressure is moved into proper alignment with the opposite side member of the frame, all as shown at Fig. 3.

At Fig. 3 there is also indicated in dotted line, an application of the operative jaw member to one of the crossbars of the frame instead of to the end of the side bar. The operation is the same except that the point of application of pressure exerted by the jack is upon the crossbar of the frame, instead of upon the end of the side member of the frame, all as clearly indicated lower right Fig. 3.

At Fig. 4 there is illustrated a fragment of the apparatus in use for straightening a sag in a member of an automobile frame, such member being here indicated by the numerals 49. For such an operation the automobile is positioned above the apparatus with the member 49 above and at right angles to three holding-pressure units. In this operation the central holding-pressure unit is positioned beneath the point or apex of the sag. One of the jaw members with the jaw removed is positioned beneath said apex and the jack 46 is seated upon the top of the crown 29 of the jaw member, the upper end of the jack being in engagement with the apex of the sag. The other two holding pressure members are positioned along the rails 1 and 2 at a suitable distance on either side of the sag. In this case the right and left jaw members are provided with teeth which will engage the top of the member

4

49 of the frame and pins 39a are inserted through the crowns 29 and the jaws 32 in order to hold the jaws against the upward pull when the jack 46 is operated. It will be understood that the jaw members are held against the upward pull by the wedges 31. When the parts are thus positioned and adjusted the jack 46 is operated and exerts an upward pressure on the member 49 at the point of the sag until the same is forced upwardly to the straight position.

It will be understood that the jaw members are not only slidable in but are removable from and reversible in the slide units so that a plurality of jaw members may be inserted in any slide unit and such jaw members may face each other or may face in the same direction or in opposite directions as desired.

By similar and obvious adjustments of the holding-pressure units, the slide units, the jaw members, and the teeth, together with the application of pressure by the jack 46, any portion of the frame of an automobile may be securely held and pressure may be exerted against any desired portion of such frame, and any kind of a bend, displacement or distortion of the frame may be straightened.

It will be obvious to those skilled in the art that many changes in details of construction may be made, all within the spirit and scope of the foregoing specification and the appended claims, and I do not wish to be confined to the details of construction herein described nor to those used for illustration in the accompanying drawings.

In the drawings I have used for illustration a normally straight automobile frame but it will be understood that the apparatus may be as well applied to drop frames in which case the pressure is applied until the bent or distorted member is returned to normal (not necessarily "straight") position.

I claim—

1. In apparatus for straightening frames of automobiles and the like, the combination comprising parallel side rails, a plurality of units movably supported upon and above said rails, means to limit movement of each unit transversely of the rails, abutments carried by said units, a member carried by and movable longitudinally of each of said units and including jaw elements, for engaging such automobile frame, and abutments, means for limiting the longitudinal movement of such member, a jack adapted to seat against a unit abutment and exert pressure upon a member abutment whereby to move said member and exert pressure on the said frame.

2. In apparatus for straightening frames of automobiles and the like, the combination comprising parallel side rails, a plurality of units movably supported upon and above said rails, means to limit movement of each unit transversely of the rails, abutments carried by said units, a member carried by and movable longitudinally of each of said units and including jaw elements, for engaging such automobile frame, and abutments, means for limiting the longitudinal movement of such member, a jack adapted to seat against a unit abutment and exert pressure upon a member abutment whereby to move said member and exert pressure on said frame at a predetermined point and to hold other portions of said frame against such pressure.

3. In apparatus for straightening frames of automobiles and the like, the combination comprising parallel side rails, a plurality of units each rollingly supported by said rails and including brackets, said brackets including an abutment portion and means for engaging the rails to limit longitudinal movement of the unit transversely of the rails, a member carried by and movable longitudinally of each of said units and including jaw elements, for engaging such automobile frame, and abutments, means for limiting such longitudinal movement of such member, a jack adapted to seat against a bracket abutment and exert pressure upon a member abutment whereby to move said member and exert pressure on said frame.

4. In apparatus for straightening frames of automobiles and the like, the combination comprising parallel side rails, a plurality of units each rollingly but vertically resiliently supported by said rails and including brackets, said brackets including an abutment portion and means for engaging the rails to limit longitudinal movement of the unit transversely of the rails, a stop for limiting the downward movement of said unit against said vertically resilient support, a member carried by and movable longitudinally of each of said units and including jaw elements, for engaging such automobile frame, and abutments, means for limiting such longitudinal movement of such member, a jack adapted to seat against a bracket abutment and exert pressure upon a member abutment whereby to move said member and exert pressure on said frame.

5. In apparatus for straightening frames of automobiles and the like, the combination comprising parallel side rails, a plurality of units each movably supported by said rails, means to limit movement of each unit transversely of the rails, abutments carried by said units, a member carried by and movable longitudinally of each of said units and including jaw elements, for engaging such automobile frame, and abutments, said jaw elements being insertable and lockable in said members at any point therealong, means for limiting such longitudinal movement of such member, a jack adapted to seat against a unit abutment and exert pressure upon a member abutment whereby to move said member and exert pressure on said frame.

6. In apparatus for straightening frames of automobiles and the like, the combination comprising parallel side rails, a plurality of units each movably supported by said rails, means to limit movement of each unit transversely of the rails, abutments carried by said units, a member carried by and movable longitudinally of each of said units and including jaw elements, for engaging such automobile frame, and abutments, means for limiting such longitudinal movement of said member, said jaw elements being insertable and lockable in said member at any point therealong and including a vertically movable jaw and means for vertically adjusting the jaw and means to lock the jaw on such adjusted position, a jack adapted to seat against a unit abutment and exert pressure upon a member abutment whereby to move said member and exert pressure on said frame.

7. In apparatus for straightening frames of automobiles and the like, the combination comprising parallel side rails, a plurality of units each movably supported by said rails, means to limit movement of each unit transversely of the rails, abutments carried by said units, a member carried by and movable longitudinally of each of said units and including jaw elements, for engaging such automobile frame, and abutments, means for limiting the longitudinal movement of such member, said jaw elements being insertable and lockable in said member at any point therealong and including a vertically movable jaw and means for vertically adjusting the jaw and means to lock the jaw in such adjusted position, said jaw being removable from said jaw element and the jaw element having a seat for a jack when the jaw is removed, a jack adapted to seat thereon and exert pressure upwardly against the automobile frame when positioned thereabove.

8. In apparatus for straightening frames of automobiles and the like, the combination comprising parallel side rails, a plurality of units each movably supported by said rails, means to limit movement of each unit transversely of the rails, abutments carried by said units, a member carried by and movable longitudinally of each of said units and including jaw elements, for engaging such automobile frame, and abutments, means for limiting the longitudinal movement of such member, said jaw elements being insertable and lockable in said member at any point therealong and including a vertically movable jaw and means for vertically adjusting the jaw and means to lock the jaw in such adjusted position, said jaw being removable from said jaw element and the jaw element having a seat for a jack when the jaw is removed, a jack adapted to seat thereon and exert pressure upwardly against the automobile frame when positioned thereabove at one point in said frame while said frame is held at other points by other jaws of said apparatus.

9. In apparatus for straightening frames of automobiles and the like, the combination comprising parallel side rails, a plurality of units movably supported by said rails, means to limit movement of each unit transversely of the rails, abutments carried by said units, a member carried by and movable longitudinally of each of said units and including jaw elements, for engaging such automobile frame, and abutments, means for limiting such longitudinal movement of such member, a jack adapted to seat against a unit abutment and exert pressure upon a member abutment whereby to move said member and exert pressure on the said frame, said jaw elements being provided with removable teeth, each tooth adapted to engage a member, of predetermined shape, of an automobile frame.

10. In apparatus for straightening frames of automobiles and the like, the combination comprising parallel side rails, a plurality of units movably supported by said rails, means to limit movement of each unit transversely of the rails, abutments carried by said units, a member carried by and movable longitudinally of each of said units and including jaw elements, for engaging such automobile frame, and abutments, means for limiting such longitudinal movement of such member, a jack adapted to seat against a unit abutment and exert pressure upon a member abutment whereby to move said member and exert pressure on the said frame, said member being rollingly and normally resiliently supported in said unit and having flanges overhanging portions of said unit and adapted to rest on said portions when said member is depressed.

MARCELLUS S. MERRILL.